United States Patent

[11] 3,549,882

[72] Inventor Alfred E. Barrington
 Lexington, Mass.
[21] Appl. No. 763,706
[22] Filed Sept. 30, 1968
[45] Patented Dec. 22, 1970
[73] Assignee The United States of America as represented by the Administrotor of the National Aeronautics and Space Administration

[54] LEAK DETECTOR WHEREIN A PROBE IS MONITORED WITH ULTRAVIOLET RADIATION
14 Claims, 2 Drawing Figs.

[52] U.S. Cl. .................................................. 250/43.5
[51] Int. Cl. ...................................................... G01n 21/26
[50] Field of Search .......................................... 250/43.5, 71

[56] References Cited
UNITED STATES PATENTS
2,977,842 4/1961 Duke ............................ 250/43.5X
3,457,407 7/1969 Goldberg ..................... 250/43.5X Primary Examiner—James W. Lawrence
Assistant Examiner—A. L. Birch
Attorneys—John R. Manning, Herbert E. Farmer and Garland T. McCoy ABSTRACT: According to the invention there is disclosed a novel method and apparatus for detecting leaks in an evacuated system by utilizing a stream of probe gas, preferably one taken from the Group 0 (zero) elements of the Periodic table. The particular probe gas utilized is one having an intense resonance line in the vacuum ultraviolet region of the spectrum. The invention communicates with the evacuated system by means of an opening in the vacuum line into which is placed a sample cell element together with a beam of light, containing ultraviolet radiation, for continuously monitoring the system for leaks. The beam of light is characterized as having a wavelength substantially equal to about the wavelength of the resonance line for the probe gas, so that should any probe gas be present in the system, light from the beam will be scattered and detected.

PATENTED DEC 22 1970

3,549,882

ALFRED E. BARRINGTON
INVENTOR.

BY
John R. Manning
ATTORNEY.

LEAK DETECTOR WHEREIN A PROBE IS MONITORED WITH ULTRAVIOLET RADIATION

The invention described herein was made by an employee of the United States Government and may be manufactured and used by or for the Government for governmental purposes with the payment of any royalties thereon or therefor.

BACKGROUND OF THE INVENTION

This invention relates to leak detection and more particularly to a novel method and apparatus for detecting leaks in evacuated systems by employing a spectrophotometric apparatus capable of detecting light scattering in the vacuum ultraviolet region of the spectrum and by utilizing Group 0 element as the probe gas.

In the past, those systems requiring sensitive and accurate leak detection utilized a mass spectrometer type leak detector wherein helium was used as the probe gas. This type of leak detector is reported to have a partial pressure sensitivity to helium of about $10^{-12}$ torr, which, insofar as most commercially available detectors is concerned, represents a rather high order of sensitivity. However, as ultrahigh vacuum technology developed, it became necessary to devise inexpensive systems having sensitivities that exceed or approach the best available sensitivity of the mass spectrometer type detector. This is especially true in those systems having large internal volumes. In addition the relatively high cost of both the manufacture and the operation of mass spectrometers, as well as its fragility and the requirement for a technician skilled in both its operation and maintenance, has limited its acceptance.

According to the invention a novel leak detector apparatus is provided having particular use in evacuated systems to detect the presence of any Group 0 element probe gas that may be present in the system when a stream of the probe gas is directed over the surface thereof.

The probe gas is characterized as being a gas taken from those Group 0 elements that exhibit an intense resonance line in the vacuum ultraviolet region. The wavelength corresponding to the resonance line for each respective element as was reported by Tanaka et al., J. Opt. Soc. Am., 48, 304(1958) is as follows:

| Element | Wavelength of intense resonance line |
|---|---|
| He | 584 A. reported by Huffman. |
| A | 1,067 A. reported by Tanaka. |
| Xe | 1,470 A. reported by Tanaka. |
| Kr | 1,236 A. reported by Tanaka. |
| Rn | 1,786 A. reported by Tanaka. |
| Ne | 744 A. reported by Tanaka. |

Photons may be scattered from a light beam when a quantity of probe gas, at low pressure, passes through a beam of light having a spectrum which contains the resonant line wavelength that is the same as that of the gas. The number of photons, I, scattered out of the beam is given in the following equation, $$I = (I_o) \delta (n) (s) (h) \quad (1)$$

where:
 $I^o$ = the incident photon flux (photons/cm.²/sec).
 $\delta$ = scattering cross section (cm.²).
 $n$ = molecular density (cm.⁻³).
 $S$ = beam cross sectional area (cm.²).
 $h$ = effective length of pass.

It has been determined that the resonance cross sections, $\delta$, of the preferred probe gases of xenon and krypton, at their respective resonance line wavelengths, is equal to about $10^{-13}$ cm². Accordingly, if one were to assume unity for n, S and h in the aforementioned equation and substituting this in Equation (1) together with the number of photons emitted by the xenon probe gas passing through a suitable beam of monochromatic light from a xenon lamp having a photon flux of about $10^{16}$ photons/cm² we have:

$$I = 10^{16} \times 10^{-13} \times 1 \quad (2)$$

$$I = 10^3 \text{ photons/cm.}^2/\text{sec./unit molecular density} \quad (3)$$

In other words, $10^3$ photons are scattered from a volume of 1 cm.³ when the molecular density of the xenon probe gas is only about $3 \times 10^{-17}$ torr which corresponds to one atom per cubic centimeter. Thus, the sensitivity of the subject apparatus with respect to its probe gas is many orders of magnitude greater than the sensitivity of the mass spectrometer type apparatus with respect to its probe gas, (i.e., $10^{-12}$ torr liter/sec. for helium).

Although any of the Group 0 elements, having an intense resonance line in the vacuum ultraviolet region, may be employed for purposes of the present invention, the use of xenon and krypton is preferred for the above-mentioned reasons. Additional advantages to be gained, by employing the preferred probe gases include: the fact that both xenon and krypton are present in even smaller quantities in the atmosphere than is the conventionally employed helium probe gas; and, the fact that due to the extremely high sensitivity of the detector for the gases a proportionately smaller volume of probe gas is required for use. For applications wherein high sensitivity and accuracy is not a requirement, mixtures of any one of the preferred probe gases and a suitable diluent gas may be utilized as the probe gas to be directed over the test surface. Even as little as a 1 percent mixture of xenon with a suitable diluent gas such as argon or nitrogen would provide a much more sensitive detector system than the conventional prior art mass spectrometer—helium detector system. Thus, an important consideration of my invention resides in the use of a light beam for monitoring an evacuated system, the wavelength of the beam of light being substantially equal to about the wavelength of the intense resonance line for the particular probe gas in use.

SUMMARY OF THE INVENTION

Accordingly, it is an object of the present invention to provide an inexpensive, heavy-duty leak detector requiring only ordinary skill for operation and maintenance.

Another object of the present invention is to provide an inexpensive, heavy-duty leak detector apparatus having a sensitivity at least equal to or greater than the sensitivity of a conventional mass spectrometer type detector.

Another object of the present invention is to provide an inexpensive, heavy-duty leak detector apparatus of the type wherein the sensitivity of the detector is enhanced by the use of a beam of light having a spectral content which includes a resonant wavelength in the vacuum ultraviolet region to continuously monitor an evacuated system for the presence of a probe gas. The probe gas used has an intense resonance line in the vacuum ultraviolet region corresponding to substantially about the wavelength covered by the spectrum of the beam.

The features of my invention which I believe to be novel are set forth with particularity in the appended claims. My invention itself, however, both as to its organization and method of operation, together with further objects and advantages thereof, may be best understood by reference to the following accompanying drawings.

DESCRIPTION OF THE PREFERRED EMBODIMENT

Figure 1:
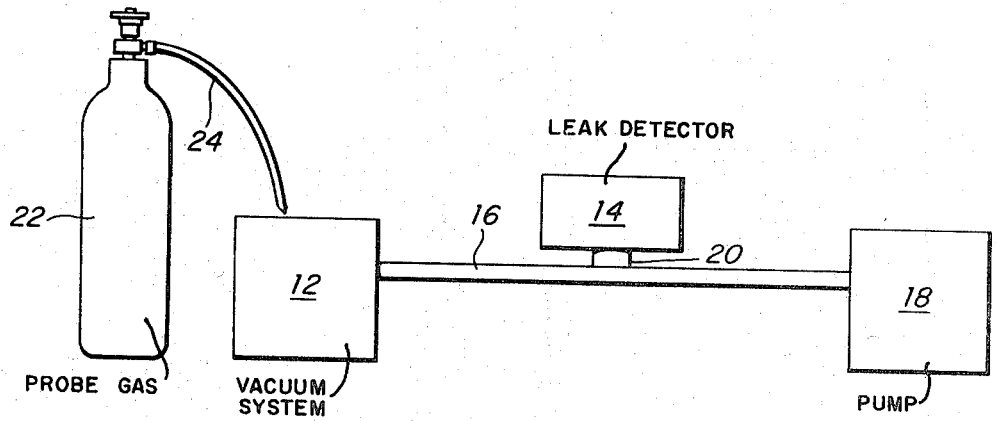
FIG. 1 is a schematic representation of a leak detector utilized with an evacuated system.

Referring to FIG. 1, there is shown a test or vacuum system 12 that is in the process of being evacuated through leak detector 14. Leak detector 14 is inserted into evacuation line 16, which connects an evacuation means, such as pump 18, to the system by suitable coupling means 20. A stream of probe gas, delivered from pressurized source 22, is directed over the surface of test system 12 by means of line 24, to determine the leak tightness of the system. When the probe gas passes near a leaking portion of system 12, a quantity of probe gas will be drawn into the system and carried away from the leak, through the system 12 and downstream toward evacuation pump means 18. Shortly after the probe gas is drawn out of system 12 and into evacuation line 16 it is made to pass into leak detector 14 where its presence is detected.

Figure 2:
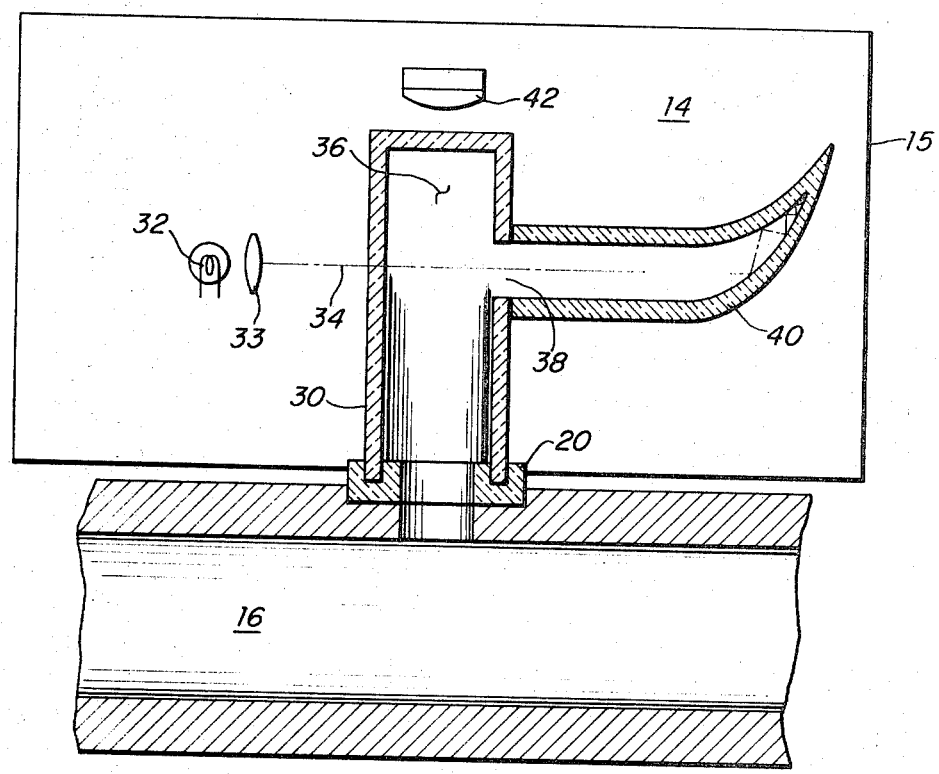
FIG. 2 is a partial sectional view of my leak detector and the cooperation of elements with the vacuum line of an evacuated system.

Referring now to FIG. 2, there is shown my leak detector 14 encased in container 15 wherein a hollow apertured, tubular, sample cell 30, having an open end that is coupled to vacuum line 16 and thus, to evacuated test system 12 (FIG. 1), by means of coupling member 20. The cell 30 is capable of passing light and particularly, is transparent to light of a given, fixed wavelength in the vacuum, ultraviolet region. Light source 32 and collimating means 33 are located adjacent cell 30 and positioned in such a manner as to be directly across from aperture 38 so that light beam 34 may be directed into cell 30, through monitor zone 36 and through aperture 38. Light beam 34 has, within its spectrum, a wavelength characterized as being substantially equal to about the wavelength of the intense resonance line for the probe gas 22 and is capable of being transmitted through the walls of cell 30. Light trap means 40 is provided adjacent aperture 38 for trapping beam 34 after it passes through aperture 38. Radiation detector 42 detects the scattered radiation and is located at the closed end of cell 30. It is positioned so as to be focused on beam 34 as it passes through monitor zone 36. Radiation detector 42 may be connected to any suitable indicating means (not shown), in order to provide data relative to the presence, if any, of the probe gas in the evacuated system.

In one embodiment of my invention, scattering of beam 34 by the presence of the probe gas, and its detection by detector 42, may be utilized to cause an audible signal to be given in order that the relative location of the leak may be readily determined with respect to the position of the probe. For an exact determination of the location of a leak, the above system may be modified so that a plurality of my leak detectors are provided and positioned in a predetermined pattern along the evacuation line. For very sensitive work, an auxiliary pump may be employed in combination with my system, in a manner consistent with other methods well known to the art. Additionally, a pinhole leak may be provided in the evacuation line, to calibrate the leak detector apparatus, if desired.

The size and shape of the sample cell may be varied, provided the resultant size and shape is consistent with its intended use. The internal volume of the cell may also vary depending on the intended use thereof. However, volumes of at least 10cm.$^3$ are required for determining leaks in systems where the sensitivity of the cell to the probe gas must be $10^{-12}$ torr liter/sec. Suitable materials for fabricating cell 30 include sapphire, calcium flouride and magnesium flouride, by way of example. The selection of the sample cell material is determined by the probe gas contemplated for use therewith in accordance with the teachings of the present invention.

Insofar as the light source 32 is concerned, any conventional light source may be used provided it is capable of producing a beam of light having a spectrum broad enough to include the requisite vacuum ultraviolet wavelength for the probe gas being used. Accordingly, the selection of the light source and of the sample cell material are dependent on a predetermined knowledge of the wavelength of the intense resonance line of the probe gas intended for use in the system and on the ability of the cell to pass a spectrum of light which includes the wavelength of the intense resonance of the line of the probe gas.

Any conventional means for detecting scattered radiation in the vacuum ultraviolet region may be employed. Useful radiation detecting devices suitable for use in the present invention include photomultipliers or photographic plates, for example.

While I have described what is presently considered the preferred embodiment of my invention, it will be obvious to those skilled in the art that various other changes and modifications may be made therein without departing from the inventive concept, and it is therefore, aimed in the appended claims to cover all such changes and modifications as fall with the true spirit and scope of my invention.

I claim:

1. Spectrophotometric apparatus for obtaining data relative to scattered radiation in low pressure zones, suitable for use as a leak detector in an evacuated system wherein a stream of probe gas is directed over the exterior of the system, the gas characterized as producing relatively large amounts of scattering in a beam of light of known wavelength, when a quantity of the gas is present, as a result of a leak in the evacuated system, the apparatus comprising:

a sample cell having a first aperture at one end thereof for communication with the evacuated system;

a second aperture on the side of the sample cell;

a source of light directing a beam into and through the cell and into the second aperture, the source located near and positioned adjacent the side of the cell opposite the second aperture, and having a frequency substantially equal to the frequency of the resonance line of the probe gas;

means detecting any light scattered from the beam, within the cell, when gas that may be present in the system passes through the beam; and means for trapping and absorbing light from the beam after it passes through the second aperture.

2. The apparatus of claim 1 wherein the probe gas is a gas selected from the group consisting of Group 0 elements having an atomic weight of less than 132.

3. The apparatus of claim 1 wherein the probe gas is xenon.

4. The apparatus of claim 3 wherein the wavelength of the scatter-free beam is substantially about 1,470 A.

5. The apparatus of claim 1 wherein the probe gas is krypton.

6. The apparatus of claim 5 wherein the wavelength of the scatter-free beam is substantially about 1,236 A.

7. The apparatus of claim 1 wherein the probe gas is argon.

8. The apparatus of claim 7 wherein the wavelength of the scatter-free beam is substantially about 1,067 A.

9. The apparatus of claim 1 wherein: the probe gas is a mixture consisting of a gas selected from the Group 0 gases and a suitable diluent gas.

10. The apparatus of claim 1 wherein the wavelength of the light beam is substantially equal to about that of the most intense resonance line in the vacuum ultraviolet region for the probe gas.

11. A method of detecting leaks in low-pressure zones, suitable for use as a leak detector in systems wherein a stream of probe gas is directed over the exterior of the system, the steps comprising:

providing a sample cell communicating with the system;

collecting a portion of the probe gas in the cell;

passing a beam of light through the cell, the light having at least one frequency wavelength in its spectrum substantially equal to the frequency of the resonance line of the probe gas;

detecting any light scattered from the beam within the cell, when the beam passes through any gas that may be present in the cell; and trapping and absorbing light from the beam after it passes through the cell.

12. The method of claim 11 wherein the probe gas is a gas selected from the group consisting of Group 0 elements having an atomic weight of less that 132.

13. The method of claim 11 wherein the probe gas is a mixture of a gas selected from the group consisting of Group 0 elements and a diluent gas.

14. The method of claim 11 wherein the wavelength of the beam of light is substantially equal to about that of the most intense resonance line in the vacuum ultraviolet region for the probe gas.